J. E. BISSELL.
POWER TRANSMITTING MECHANISM.
APPLICATION FILED MAR. 20, 1909.

1,077,118.

Patented Oct. 28, 1913.
3 SHEETS—SHEET 1.

WITNESSES:

INVENTOR
Joseph E. Bissell
by Christy and Christy
Atty's

J. E. BISSELL.
POWER TRANSMITTING MECHANISM.
APPLICATION FILED MAR. 20, 1909.
1,077,118.
Patented Oct. 28, 1913.
3 SHEETS—SHEET 2.
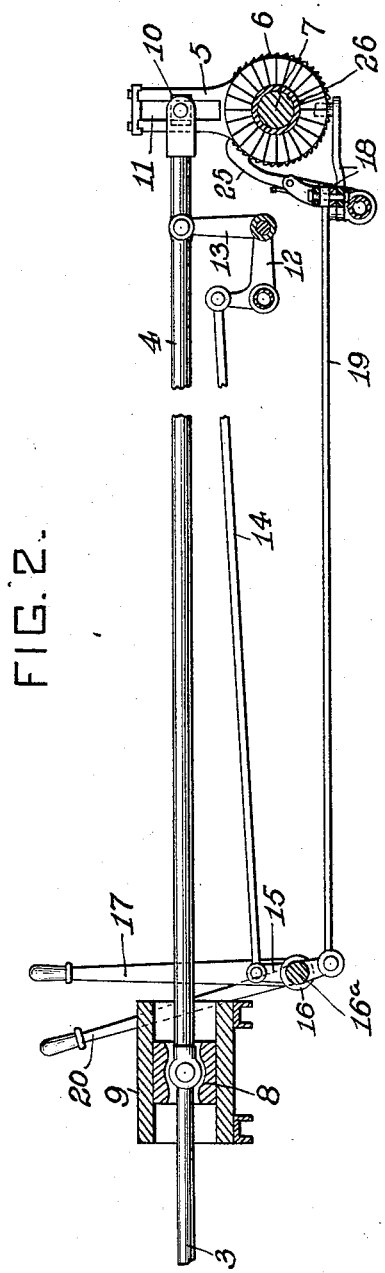
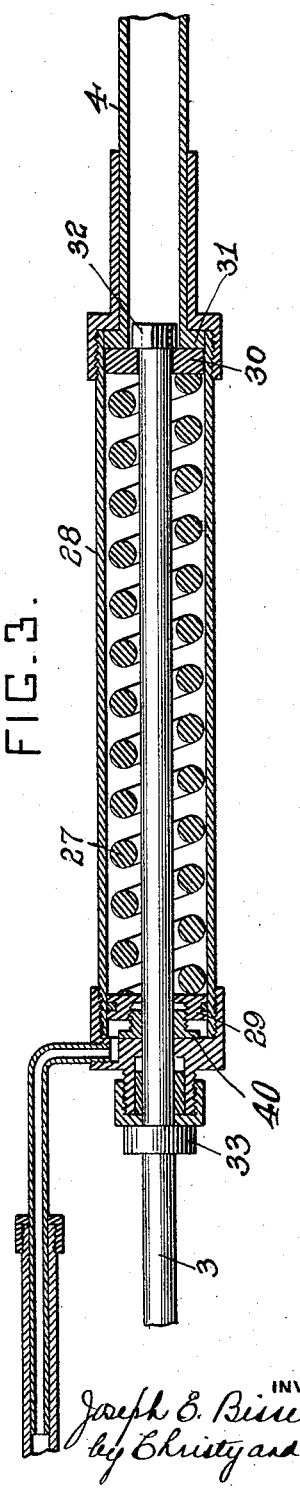
WITNESSES:
INVENTOR J. E. BISSELL.
POWER TRANSMITTING MECHANISM.
APPLICATION FILED MAR. 20, 1909.
1,077,118.
Patented Oct. 28, 1913.
3 SHEETS—SHEET 3.
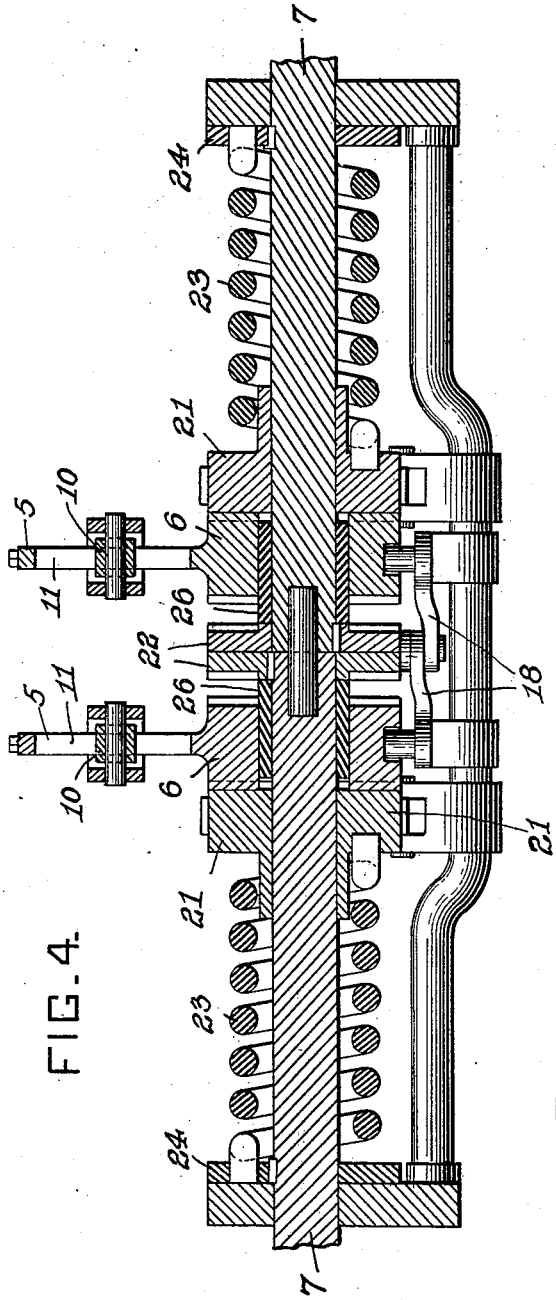
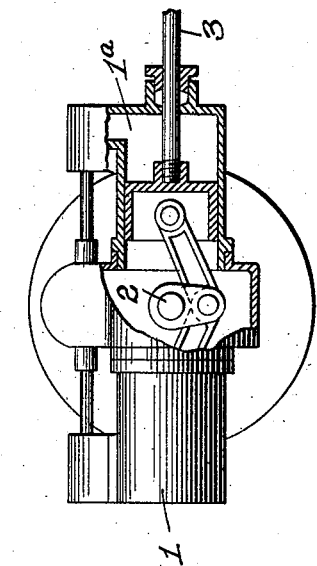
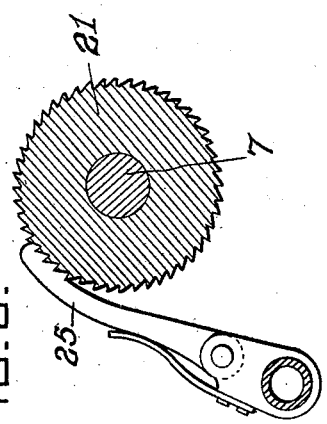
WITNESSES:
INVENTOR

UNITED STATES PATENT OFFICE.

JOSEPH E. BISSELL, OF PITTSBURGH, PENNSYLVANIA.

POWER-TRANSMITTING MECHANISM.

1,077,118.  Specification of Letters Patent.  Patented Oct. 28, 1913.

Application filed March 20, 1909. Serial No. 484,741.

*To all whom it may concern:*

Be it known that I, JOSEPH E. BISSELL, residing at Pittsburgh, in the county of Allegheny and State of Pennsylvania, a citizen of the United States, have invented or discovered certain new and useful Improvements in Power-Transmitting Mechanism, of which improvement the following is a specification.

The invention described herein relates to certain improvements in mechanism for transmitting and transforming the power generated by a reciprocating motor to a shaft, said improvements being especially applicable for connecting the motor to the driven axle of automobiles, etc.

The invention is hereinafter more fully described and claimed.

Figure 1:
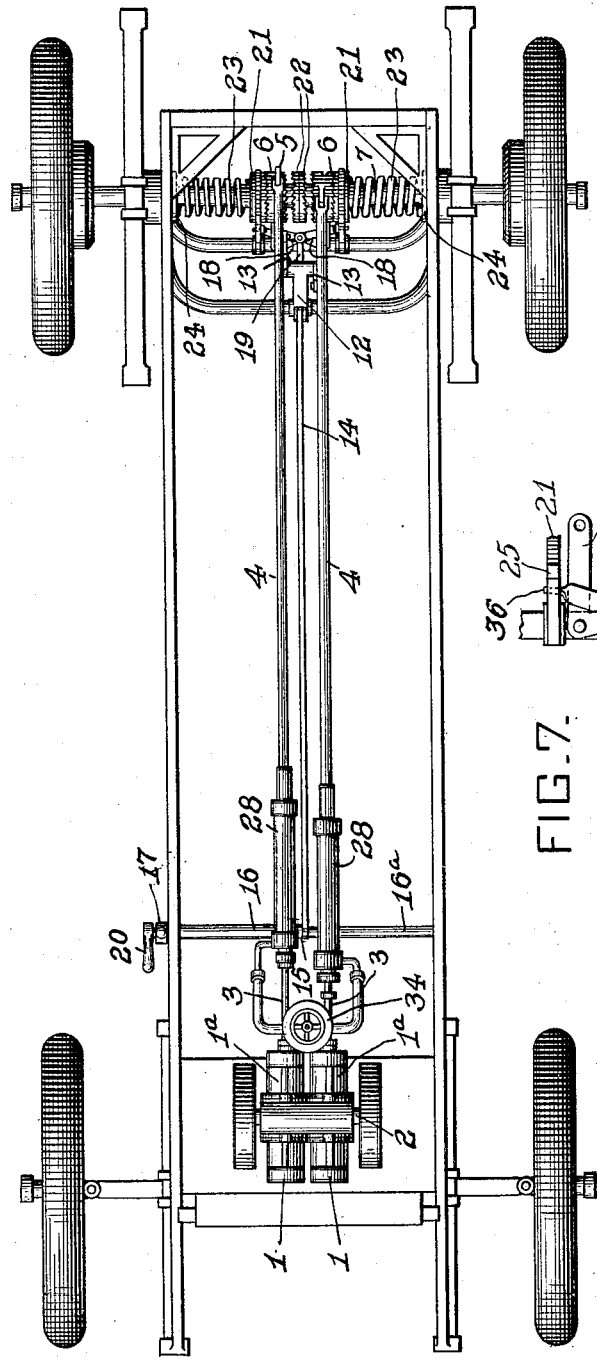
Figure 7:
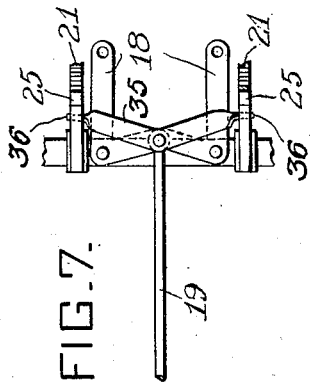

In the accompanying drawings forming a part of this specification, Figure 1 is a plan view of the chassis of an automobile showing my improved transforming and transmitting mechanism connecting the motor and driven axle; Fig. 2 is a view partly in side elevation and partly in section showing the connections from the motor to the axle; Fig. 3 is a sectional view on an enlarged scale of a speed regulation mechanism adapted to be interposed in the connection between the motor and axle; Fig. 4 is a sectional view of the driven axle and parts carried thereby; Fig. 5 is a sectional detail view showing the retaining pawl; Fig. 6 is a view partly in section and partly in elevation of the preferred form of motor and the driving connection extending therefrom and Fig. 7 is a detail view showing the means for shifting the members of the clutch mechanism and releasing the retaining pawls.

In the practice of my invention any suitable form of motor is employed whereby a reciprocating movement may be imparted to the connections leading to the axle and shaft. It is preferred to employ a motor of the type shown consisting of two four or more cylinders 1 1ª arranged in pairs, the members of each pair being on opposite sides of the shaft 2 and having their pistons connected to a common crank pin or independent crank pins correspondingly arranged. In this form of engine it is customary to utilize the shaft 2, which carries the fly wheel or wheels to rotate the axle or shaft to be driven. It is preferred however to provide the pistons of the rear cylinders 1ª with piston-rods 3 extending through stuffing boxes on the rear heads of the cylinders. The piston rods are connected by pitmen 4 to arms 5 projecting from sleeves 6 loosely mounted on the axle or shaft 7, which it is desired to drive.

It will be understood that the abutment 29 may be adjustably secured to the cylinder-head by means of screw-thread connection to the collar 40, which in turn may be secured, in any desired manner, to the cylinder-head. Thus the tension of the spring 27 may be properly adjusted.

The connection between the piston rods and pitmen may be formed by a cross-head 8 mounted in guides 9. The pitmen may be connected directly to the arms 5 or to blocks 10 movably mounted in slots 11 in the arms, as shown in Fig. 2. In such case provision is made for adjusting the blocks along the slots. This can be conveniently done by connecting one arm of a bell crank lever 12 by links 13 to the pitmen adjacent to the blocks, while the other arm of the bell crank is connected by a rod 14 extending toward the front of the machine, to an arm 15 on a sleeve 16 loosely mounted on the shaft 16ª and provided with an operating handle 17. As will be readily understood the shifting of the block will vary the arc through which the arms 5 are moved and will also vary the efficiency of the power applied to the arms.

As before stated the sleeves 6 are loosely mounted on the axle so as to be capable of rotation around the axle and also being moved along the same. The longitudinal movement is preferably effected by means of bell crank levers 18, one arm of which is provided with pins projecting into peripheral grooves in the sleeves, while the other arms are connected by a rod 19 to an arm on the shaft 16ª, which is provided with an operating handle 20. The sleeves are provided with suitable means whereby, when properly shifted they will engage either the disks 21 or 22 connected to the shaft or axle. In the construction shown the sleeves are provided on their ends with teeth oppositely arranged, respectively, so that the sleeves when moving in one direction, will if in engagement with the disks 21 rotate the shaft in that direction, but if shifted to engage the disks 22 will rotate the shaft only when moving in the opposite direction. The disks 21 are connected to the shaft or axle through the medium of coiled springs 23, which have one end secured to the disks 21 and the opposite ends to the axle, preferably through disks 24 keyed to the axle, as shown in Fig. 4. When the arms 5 are shifted to the left in Fig. 2 or in a direction to impart a forward movement to the machine, the springs will be placed under tension before any movement is imparted to the axle and such tension will be maintained while the arms are moving to the left. When the arms move to the right the tension under which the springs were placed would tend to cause the disks 21 to follow the sleeves for a part of their backward movement. This return movement of the disks is prevented by spring pawls 25, so that the tension under which the springs are placed during the first part of the movement of the arms 5 to the left, will be utilized in continuing the forward rotation of the shaft or axle. Hence although the arms are yieldingly connected to the axle and a part of their power is absorbed in placing the springs under tension, such power is not wholly lost, as the springs will continue to act on the axle while the arms are moving to the right.

While the disks 22, with which the sleeves are caused to engage, when a rearward movement of the machine is desired, may be connected to the axle in the same manner as the disks 21, such connection is deemed unnecessary as the rearward movement is but a very small percentage of the total movement and is generally effected under a slow speed and hence the disks 22 are preferably keyed to the shaft or axle. The movement imparted to the sleeves longitudinally of the shaft or axle 7 to engage the disks 21, is sufficient to effect some compression of the springs, which then become effective to hold the teeth on the sleeves and disks 21 in yielding engagement. The longitudinal resilience of the rod 19 will also assist in maintaining the sleeves and disks 21 in engagement. It is preferred to utilize this longitudinal resilience of the rod 19 to hold sleeve 6 in engagement with the disks 22 when the machine is moving backward. In order to prevent the spring actuated disks 21 from following the sleeves, when the latter are shifted away from the disks, suitable stops are employed, which in the construction shown in Fig. 4 consist of tubes 26 surrounding the axle and forming bearing surfaces for the sleeves. When a rearward movement is desired the pawls 25 are disengaged from the disks 21. This is preferably effected by means of the rod 19 which is employed to shift the sleeves 6, and to this end an arm 35 provided at its ends with lugs 36 engaging the pawls 25, is connected to the rod 19 by the pin connecting said rod to the bell cranks 18 as clearly shown in Fig. 7.

By adjusting the point of connection of the pitmen with the arms 5, the effective length of stroke applied to the axle is varied, as well as the effective power. This regulation of the application of power to the shaft or axle, can be effected without adjusting the connection of the pitmen with the arms, by interposing between the motor and the arm, yielding connections capable of adjustment, so that the piston of the motor will have more or less movement before such connections will be placed under sufficient stress to transmit the motion of the piston to the axle. A suitable construction for this purpose is shown in Figs. 1 and 3, and consists of springs 27 arranged in cylinders 28 and bearing at one end against adjustable heads or abutments 29 and at their opposite ends against movable abutments 30. It will be understood that the abutment 29 may be adjustably secured to the cylinder head protrusion 40 as by screw threads, to the end that the tension of the spring 27 may be properly adjusted. The pitmen 4 bear against the abutments 30, the ends of the pitmen extending into the cylinders and having heads or enlargements 31 adapted to engage the cylinder when the piston-rods move to the left in Figs. 1 and 3, or during the movement of the rods effective in producing a forward movement of the machine. The piston rods 3 are extended through the springs and abutments 30 and are provided with enlargements 32 adapted to bear against the same side of the abutments 30 as the pitmen 4. The piston rods 3 are also provided with shoulders 33 adapted to bear against the ends of the cylinders 28 when the piston rods are moving to the right in Figs. 1 and 3.

In describing the operation of the regulator, it will be supposed that the piston rod 3 is beginning its movement to the left, and the several parts are in the position shown in Fig. 3. By means of the engagement of the head 32 with the abutment 30, the spring 27 will be compressed, the opposite end of the spring bearing against the front end of the cylinder, or the adjustable abutment 29 interposed between such end of the cylinder and the spring. The amount of compression of the spring will depend upon the tension of the spring and the resistance which the cylinder will present by reason of its connection to the shaft or axle through the interlocking of the head 31 on the pitman 4 with the rear end of the cylinder. When the piston rod reaches the limit of its movement to the left, the several parts will return to normal position shown in Fig. 3, and when the piston begins its movement to the right, the collar 33 on the rod 3 will push the cylinder in the same direction and through the spring 27 exert a resilient push on the pitman 4. By adjusting the head or abutment 29 along the cylinder the normal tension of the spring 27 can be varied as required. While not limiting the invention claimed herein to such method of adjustment that shown in Fig. 3 is for many purposes desirable, and consists in forcing a suitable fluid between the end of the cylinder and the head or abutment 29, which is provided with suitable means for forming tight joints with the cylinder and with the piston rod 3, passing through the abutment. The cylinder has an inlet port connected by a pipe to a suitable source of fluid under pressure as the pump 34, which can be operated by hand. As the cylinder 28 is movable the pipe connection consists of two sections connected respectively to the pump and cylinder and one movable within the other. As will be readily understood, the tension of the spring 27 can be increased by forcing fluid into or permitting it to escape from the cylinder. By increasing the tension of the spring, the movement of the piston rod independent of the arm 5 can be reduced, or in other words by increasing such tension, the effective length of stroke of the pitman is increased.

Reciprocating pawls and ratchet wheels have been long employed where a high speed of the driven part is not required, and further in order to approximate a continuous drive, a plurality of pawls and ratchets have been used. While such mechanism is efficient for transmitting power, it is impracticable at high speeds, as each pawl at the beginning of its forward movement will engage the ratchet suddenly and the result is that power is applied to the ratchet wheel by a series of blows, and the resultant movement or rotation is jerky. It is characteristic of my improvement that by the interposition of suitable power storing means between the ratchet and the shaft or other part to be driven; a portion of the power of the motor during the forward movement or while driving the ratchet wheel will be taken up by the power storing means and will be applied to the driven part or shaft during the backward movement of the motor or while the motor is disengaged from the shaft. It is further characteristic of my improvement that by the interposition in the connection between the motor and the pawl or reciprocating member of a member resilient when subjected to a force of predetermined value or greater, the duration of the application of power to the shaft or part to be driven is automatically adjusted in accordance with the load. And further the adjustment of the tension of this resilient member can be effected without stopping the motor.

I claim herein as my invention:

1. The combination of a shaft, ratchet wheels having reversely arranged teeth secured to said shaft, the attachment of one of said wheels being resilient, a reciprocating part loosely mounted on said shaft and having teeth constructed to engage said wheels during forward and backward strokes respectively, means for preventing the backward movement of the wheel having the resilient connection to the shaft, and means for simultaneously shifting the said reciprocating part and the said wheel retaining means.

2. In a power transmitting mechanism, the combination of angularly arranged rotating crank pins, shafts, toothed disks having resilient connections to the shafts, oppositely toothed disks also connected to the shafts, arms loosely mounted to the shafts and adapted when moving in one direction to engage one set of disks and when moving in the opposite direction to engage the other set of disks, detents for preventing a backward movement of the resiliently connected disks, and means for shifting the arms from engagement with one set of disks into engagement with the other set of disks and simultaneously shifting the detents.

In testimony whereof, I have hereunto set my hand.

JOSEPH E. BISSELL.

Witnesses:
 ALICE A. TRILL,
 FRANCIS J. TOMASSON.

---

Copies of this patent may be obtained for five cents each, by addressing the "Commissioner of Patents, Washington, D. C."